United States Patent Office 3,213,170
Patented Oct. 19, 1965

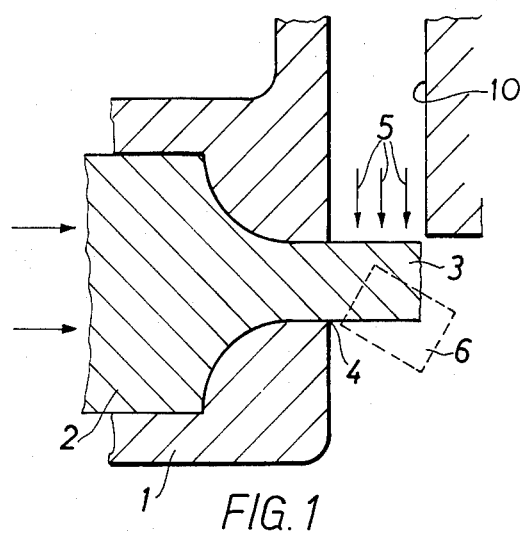
FIG. 1
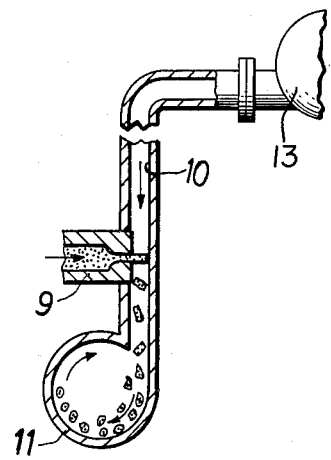
FIG. 3
FIG. 2
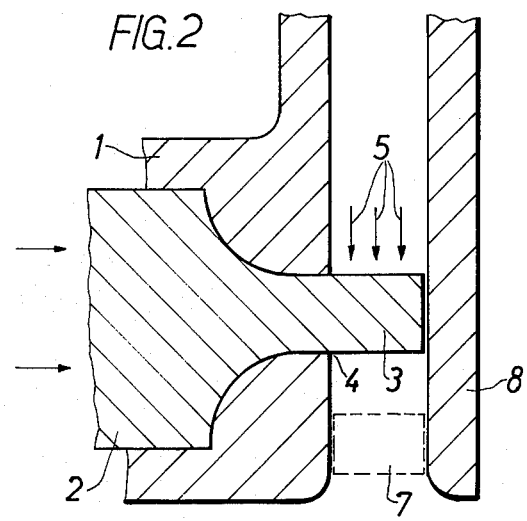
FIG. 4
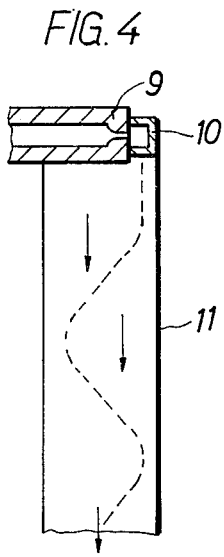
INVENTORS:
RUDOLF ERDMENGER, KURT STADE.

3,213,170
PROCESS FOR THE MANUFACTURE OF GRANULATED MATERIAL OF CYLINDRICAL OR OTHER FORM
Rudolf Erdmenger, Bergisch-Gladbach, Germany, and Kurt Stade, Graz, Austria, assignors to Farbenfabriken Bayer Aktiengesellschaft, Leverkusen, Germany, a German corporation
Filed Jan. 25, 1962, Ser. No. 168,717
10 Claims. (Cl. 264—142)

The invention relates to a process for the manufacture of granulated material of cylindrical or other form from mouldable compositions, in which the composition is ejected in the form of a continuous length from a die opening and the extruded length extending from the opening is severed.

With the known processes of this nature, the severing of the extruded sections is effected by means of a periodically operating cutter blade. The length of a severed granule may be determined by the speed of advance of the extruded length and by the frequency of the periodically cutting blade. Another method of establishing the length of the extruded pieces is to force a measured quantity of substance in a rhythmic sequence of impacts, and to cut off the piece between two impacts, the said piece projecting for a predetermined length from the nozzle and being at rest.

As long as no very high standards are set as regards the diameters and lengths of the required cylindrical granulated elements, for example diameters of 2 mm. or more and lengths of 5 times the diameter and over are possible, scarcely any difficulties are found with the known processes. However, if granulated elements with a diameter smaller than 2 mm. and with lengths of at the most twice the diameter are required, which elements are to be as far as possible of the same thickness and length, considerable difficulties arise with the known methods of manufacture. These difficulties are due to the fact that the speed of advance of the lengths of composition with this small diameter cannot be kept constant, so that it is not possible for them to be cut into elements of the same length by means of the known cutting devices. On the other hand, small quantities of material cannot be measured with sufficient accuracy. It is therefore impossible in both cases to produce granulated elements always of the same length and especially of very small length by means of cutting.

It has now been found that these difficulties are obviated if the extruded piece of material is acted upon by means of a continuous stream of air, which is directed transversely of the direction of extrusion of the continuous length onto the section of the latter projecting beyond the edge of the nozzle. It has surprisingly been found that it is possible in this way to obtain a granulated material with a high degree of uniformity despite the material being advanced at different speeds and possibly hesitantly. The air stream breaks off the extruded element forced from the nozzle at the edge of the latter. Since the bending force (dynamic pressure times surface projection of the extruded piece) is proportional to the length of the extruded piece against which the air is blowing, but on the other hand also the bending moment is proportional to this length, there exists a quadratic dependence of the maximum bending stress in the material on the length of the extruded piece projecting beyond the edge of the nozzle. Thus, there is produced a very uniform length of the granulated element which is broken off, if the air pressure and the consistency of the material remain the same.

A great advance of this process consists in that the length of the granulated elements is independent of the speed of advance of the continuous length, since in fact all extruded pieces only break off on reaching the breaking stress, that is to say, upon projecting for a predetermined length beyond the edge of the nozzle, the length remaining practically the same if the air pressure and the material properties of the composition are kept constant. It is possible in this way for relatively large quantities of cylindrical or also hollow cylindrical granulated elements or, depending on the shape of the nozzle opening, granulated elements of any desired form, to be produced with a high degree of uniformity.

In order that extruded pieces of plastic, bendable compositions, i.e. compositions which do not break easily, can be severed satisfactorily by the air stream at the edge of the nozzle, the extruded pieces issuing from the nozzle are brought into contact at their free ends with a wall arranged at a distance from the nozzle opening. The static air pressure then building up in the partially covered duct always detaches the extruded piece in a kind of stamping operation (shearing), since the said piece is held at one end at the nozzle opening and rests at the other end on the duct wall. It is possible in this way to obtain a very large number of granulated elements per unit of time. For example, a soft paste of finely ground phosphate and water (28–30% moisture) can be granulated to give a maximum of 1800 particles with a diameter of 1 mm. and a length of 1.5 mm. per second.

The principle of the dynamic pressure granulation is explained by reference to the drawing. FIGURES 1 and 2 show diagrammatically the breaking-off or the shearing off of the extruded piece by means of the air stream. FIGURES 3 and 4 illustrate diagrammatically an installation for the dynamic pressure granulation.

In detail: The reference 1 represents an extrusion nozzle 2, a pasty composition to be granulated and 3 an extruded piece projecting from nozzle rim 4. This extruded piece 3 which is still connected to the main composition 2 is acted upon by the air stream pumped by compressor 13 through the duct 10 in the direction of the arrows 5 and thereby broken off at the rim 4 of the nozzle when it projects a predetermined length. As shown in FIGURE 1 in a dotted line the extruded piece leaves the apparatus as a granulated element 6. In the same manner, according to FIGURE 2, the piece 3 is sheared off by the air stream 5 at the edges 4 of the nozzle (see the element 7 shown in dotted line). A wall 8 forms a duct in conjunction with the extrusion nozzle 1, the air stream being directed through this duct towards the piece 3. Since the piece 3 is bearing at its end against the wall 8, the length thereof is determined by the spacing of the wall 8 from the nozzle rim 4.

The apparatus for dynamic pressure granulation, according to FIGURES 3 and 4, consists of an extrusion nozzle 9, an air duct 10 and a tube 11 which is connected thereto and on the inside wall of which the granulated elements which are produced can be further rounded by rolling or rubbing. It is advantageous to work with pre-heated air in order to dry the surfaces of the particles. The separation of the particles from the air is effected in known manner by a cyclone or filter (not shown).

We claim:
1. A process for the manufacture of granulated materials from moldable material of uniform composition which comprises:
(a) continuously extruding the material through a die opening to provide a projection of the material from the die opening,
(b) directing a continuous stream of gas at a substantially constant supply pressure transversely of the direction of extrusion and over a length of the projection in the direction of the extrusion to impose a force over said length effective to break the projection substantially at said opening.

2. Process according to claim 1, wherein the projection has a diameter less than about 2 mm. and of length less than about 2 times the diameter.

3. Process according to claim 1, wherein the gas stream extends over the entire length of the projection in the direction of extrusion.

4. Process according to claim 1, wherein a wall member is disposed opposite the opening and spaced therefrom a distance substantially equal to the length of the granules in the direction of extrusion, and said projection abuts with said wall prior to the breaking off thereof, whereby bending of the projection is prevented and the projection is held by the wall for the shearing thereof by the gas stream.

5. Process according to claim 4, wherein the projection has a diameter less than about 2 mm. and of length less than about 2 times the diameter.

6. Process according to claim 4, wherein the gas stream extends over the entire length of the projection in the direction of extrusion.

7. Apparatus for the production of granulated materials which comprises:
  (a) means for extruding a moldable material including a die opening for continuous issuance of extruded material,
  (b) a duct for directing a stream of gas over a length of material as it issues from the die opening upon issuance thereof as aforesaid, and
  (c) means for directing a gas stream into said duct at a substantially constant pressure.

8. Apparatus according to claim 7, said opening having a diameter of less than about 2 mm.

9. Apparatus according to claim 7, and including a wall disposed opposite and spaced from said opening for abuting thereon of material extruded through the die opening.

10. Apparatus according to claim 9, said die opening having a diameter of less than about 2 mm. and said wall being spaced from the die opening less than about 2 times the diameter.

References Cited by the Examiner
UNITED STATES PATENTS

| | | | |
|---|---|---|---|
| 2,539,916 | 1/51 | Ludington et al. | 18—12 |
| 2,576,977 | 12/51 | Stober. | |
| 2,881,503 | 4/59 | Johnson | 25—105 XR |

ROBERT F. WHITE, *Primary Examiner.*

MICHAEL V. BRINDISI, ALEXANDER H. BRODMERKEL, *Examiners.*